US011716777B2

(12) United States Patent
Panchal et al.

(10) Patent No.: US 11,716,777 B2
(45) Date of Patent: Aug. 1, 2023

(54) METHOD AND SYSTEM FOR DUAL CONNECTIVITY PATH SELECTION

(71) Applicant: Verizon Patent and Licensing Inc., Basking Ridge, NJ (US)

(72) Inventors: Jignesh S. Panchal, Hillsborough, NJ (US); Maqbool Chauhan, Keller, TX (US); Sudhakar Reddy Patil, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 44 days.

(21) Appl. No.: 17/347,673

(22) Filed: Jun. 15, 2021

(65) Prior Publication Data

US 2022/0400529 A1    Dec. 15, 2022

(51) Int. Cl.
| | | |
|---|---|---|
| *H04W 76/15* | (2018.01) | |
| *H04W 76/11* | (2018.01) | |
| *H04W 28/02* | (2009.01) | |
| *H04W 24/10* | (2009.01) | |

(52) U.S. Cl.
CPC .......... *H04W 76/15* (2018.02); *H04W 24/10* (2013.01); *H04W 28/0263* (2013.01); *H04W 28/0268* (2013.01); *H04W 76/11* (2018.02)

(58) Field of Classification Search
CPC ..... H04W 76/15; H04W 76/11; H04W 24/10; H04W 28/0263; H04W 28/0268; H04W 28/0252; H04W 28/0289; H04W 28/0815; H04W 28/08; H04W 36/0027; H04W 36/0069; H04W 72/08; H04W 72/087; H04W 72/10; H04W 40/04
See application file for complete search history.

(56) References Cited

U.S. PATENT DOCUMENTS

| | | | | |
|---|---|---|---|---|
| 2014/0094168 | A1* | 4/2014 | Aikawa | H04W 48/16 455/434 |
| 2015/0181473 | A1* | 6/2015 | Horn | H04W 36/125 370/329 |
| 2015/0282239 | A1* | 10/2015 | Han | H04W 36/04 370/329 |
| 2020/0029240 | A1* | 1/2020 | Li | H04W 28/0226 |
| 2021/0204198 | A1* | 7/2021 | Xin | H04L 41/342 |
| 2021/0314783 | A1* | 10/2021 | Yoo | H04W 48/16 |
| 2022/0086951 | A1* | 3/2022 | Teyeb | H04W 76/19 |
| 2022/0264679 | A1* | 8/2022 | Tamura | H04W 4/021 |

FOREIGN PATENT DOCUMENTS

| | | | |
|---|---|---|---|
| KR | 100689733 B1 * | 3/2007 | |
| WO | WO-2020243291 A1 * | 12/2020 | H04L 1/1621 |

OTHER PUBLICATIONS

Taksande, Dual Connectivity Support in 5G, Apr. 2018, IEEE.*

* cited by examiner

*Primary Examiner* — Sudesh M Patidar

(57) ABSTRACT

A method, a device, and a non-transitory storage medium are described in which a dual connectivity path selection service is provided. The service may select a network path for dual connectivity. The service may use mapping information that may correlate network parameters and values to dual connectivity configurations. The service may compare parameters included in a configuration request pertaining to end devices with the mapping information for selection of a dual connectivity configuration.

20 Claims, 12 Drawing Sheets

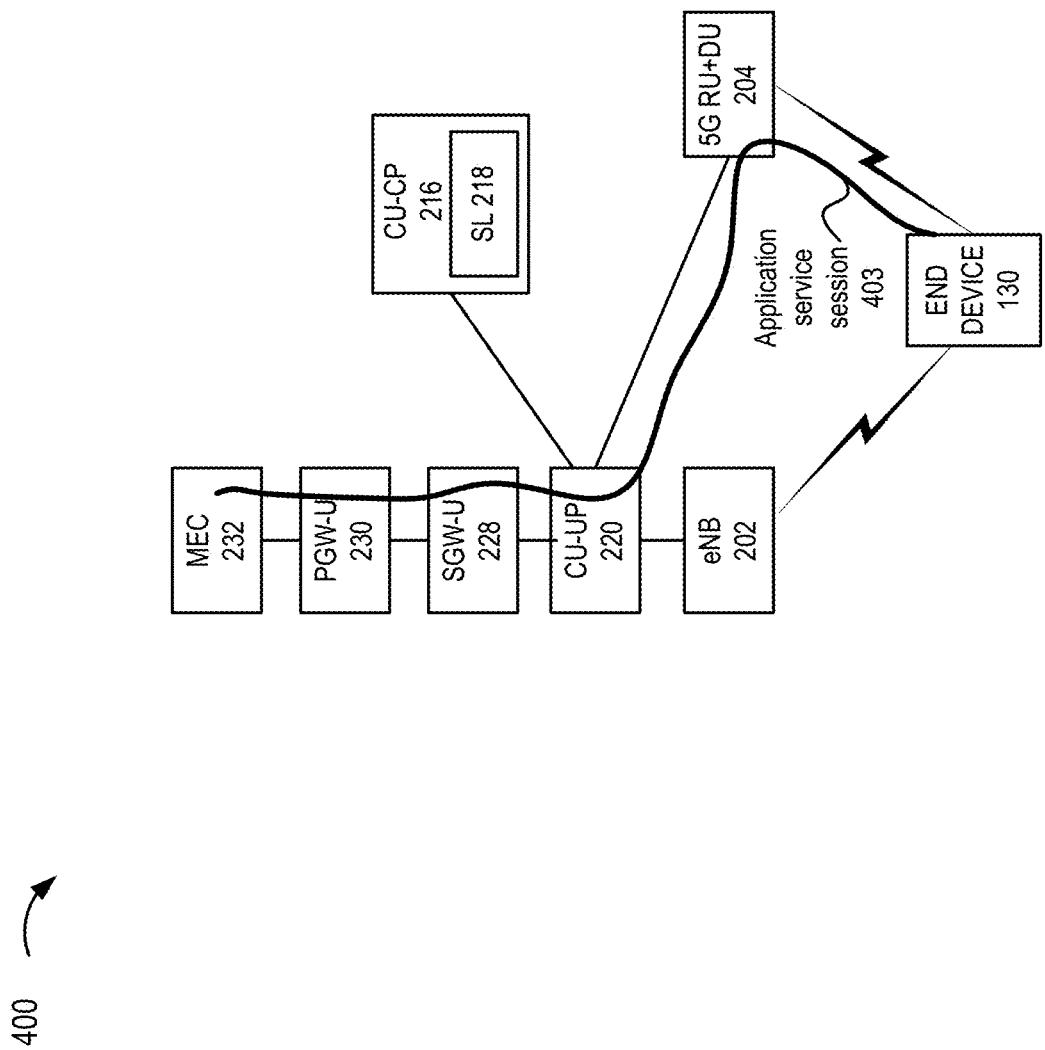

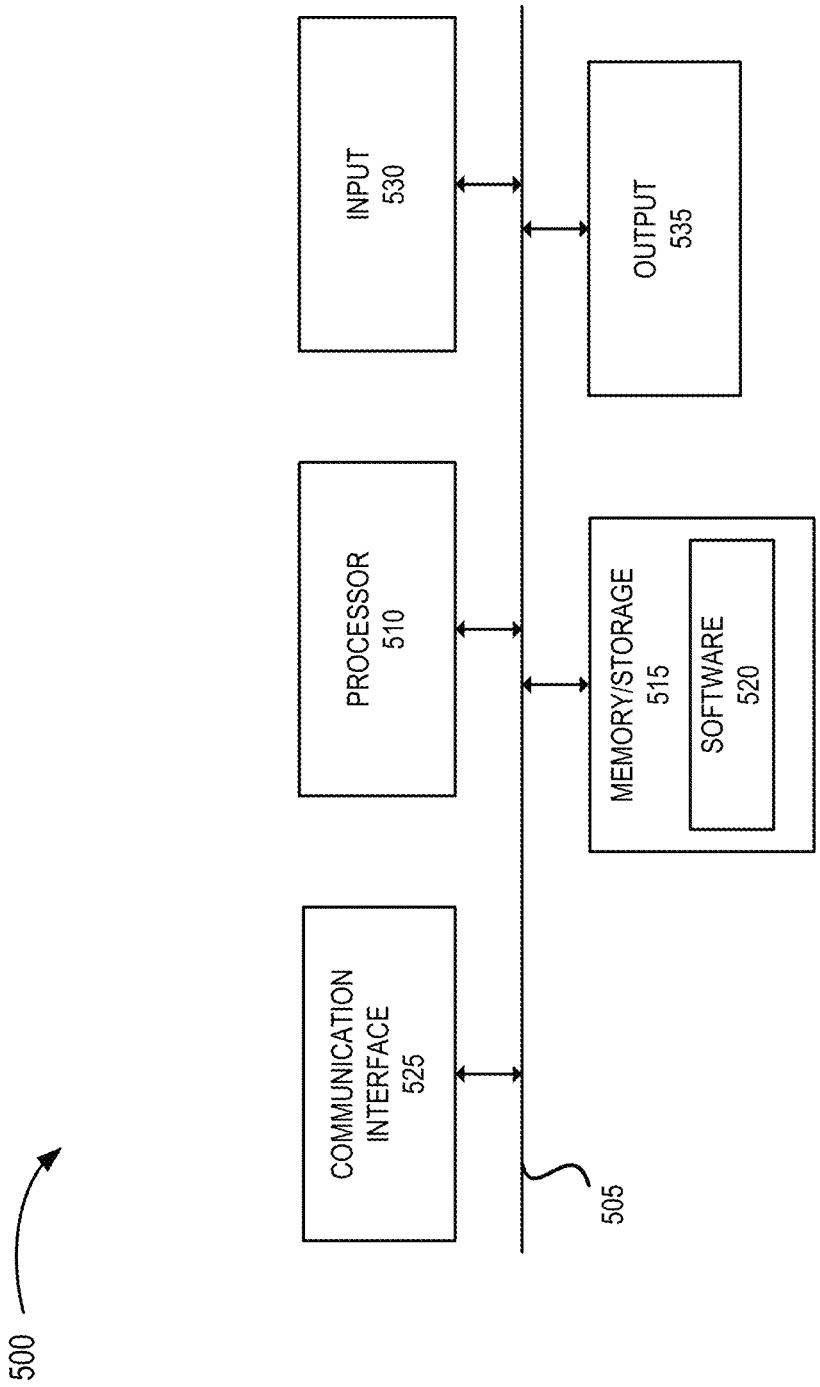

METHOD AND SYSTEM FOR DUAL CONNECTIVITY PATH SELECTION

BACKGROUND

Development and design of networks present certain challenges from a network-side perspective and an end device perspective. For example, Next Generation (NG) wireless networks, such as Fifth Generation New Radio (5G NR) networks are being deployed and under development. The development and design of a 5G NR network may include increasing data transfer rates, increasing spectral efficiency, improving coverage, reducing latency and enhancing end user application services for end devices, for example. Additionally, other services, such as dual connectivity (DC), have been introduced to provide similar advantages.

BRIEF DESCRIPTION OF THE DRAWINGS

FIGS. 4E and 4F are diagrams illustrating other bearer configurations provided by an exemplary embodiment of the dual connectivity path selection service;

FIG. 5 is a diagram illustrating exemplary components of a device that may correspond to one or more of the devices illustrated and described herein.

DETAILED DESCRIPTION

Figure 1:
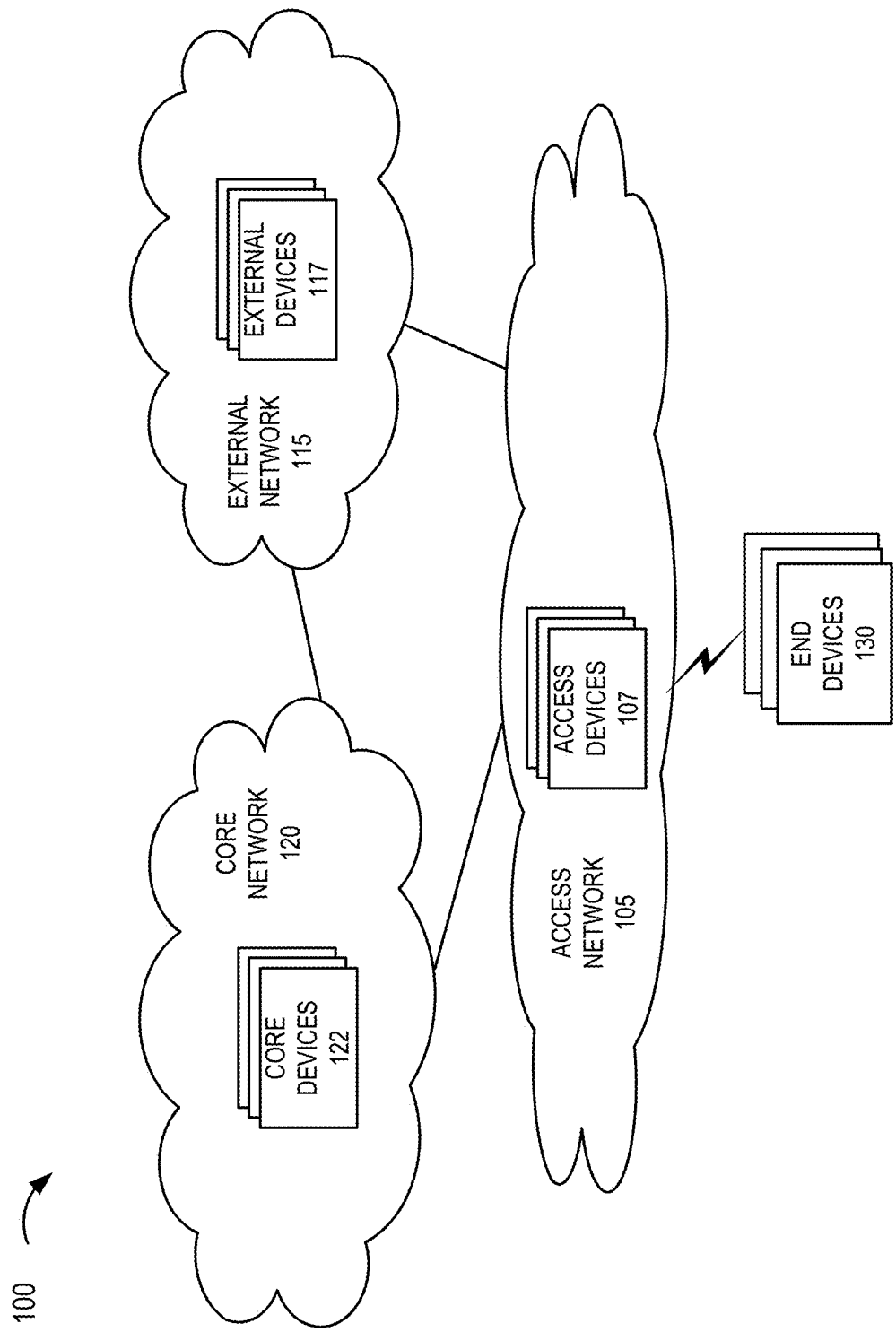
FIG. 1 is a diagram illustrating an exemplary environment in which an exemplary embodiment of a dual connectivity path selection service may be implemented.

The following detailed description refers to the accompanying drawings. The same reference numbers in different drawings may identify the same or similar elements. Also, the following detailed description does not limit the invention.

Dual connectivity may increase the throughput, among other things, of an end device, for example, by utilizing resources from multiple carriers. For example, Evolved Universal Radio Access-New Radio (E-UTRA-NR) or EN-DC Non-Standalone (NSA) may support dual connectivity in which an evolved Node B (eNB) may serve as a master node (MeNB) and a next generation Node B (gNB) may serve as a secondary node (SgNB). According to another example, NR-DC may support dual connectivity in which both the master and secondary nodes may be gNBs. Various complexities are associated with dual connectivity, such as determinations regarding when dual connectivity may or may not be desirable, control signaling associated with dual connectivity, determinations regarding when to add or drop a secondary node, the management of multiple secondary cell groups (SCGs) and mapping SCG bearers to different applications, among other issues.

According to exemplary embodiments, a dual connectivity path selection service is described. According to an exemplary embodiment, the dual connectivity path selection service may be implemented in a multi-connectivity context. For example, the multi-connectivity context may pertain to dual connectivity or higher context (e.g., more than two connections between an end device and an access network). According to another exemplary embodiment, the dual connectivity path selection service may be implemented in a unitary connectivity context (e.g., a single connection between the end device and the access network), a transition between a unitary connectivity context to a multi-connectivity context, and vice versa. According to yet other exemplary embodiments, the dual connectivity path selection service may pertain to other contexts, such as handovers, change in master node, change in secondary node, change in secondary cell group, and/or other types of contexts, as described herein.

According to an exemplary embodiment of the dual connectivity path selection service, a network device may include logic that selects a network path (e.g., end-to-end between an end device and an application service host device) or a portion thereof, such as a RAN portion of the network path and/or another segment of the network path.

According to an exemplary embodiment, the network device may make determinations, selections of network paths or portions thereof, and/or other supporting operations, as described herein, based on mapping information, as described herein. For example, the mapping information may include mappings or correlations between different types of information, such as cell global identifiers (CGIs), physical cell identifiers (PCI), global network device identifiers (e.g., globally unique eNB identifier (GUeNBI), a globally unique distributed unit identifier (GUDUI), GUgNBI, or a globally unique identifier associated with another type of network device), quality of service (QoS) class identifiers (QCIs), 5G QIs, subscriber profile identifiers (SPIDs), radio frequency (RF) SPIDs (RFSPIDs), network path identifiers, portion of network path identifiers (e.g., segment path), type of network path or portion information (e.g., a performance metric (e.g., latency, throughput, and/or another metric) or another criterion (e.g., best available, etc.)), network slice information, user plane information (e.g., split, not split, etc.), and/or other instances of information, as described herein. According to some exemplary embodiments, the mapping information may include network resource load information and/or network resource available resource information, as described herein.

According to an exemplary embodiment, the network device may provide the dual connectivity path selection service based on other information, such as messages received from other network devices, end devices, and so forth. For example, the network device may use measurement report information, add/drop messages regarding secondary nodes, and/or other types of messages, as described herein.

In view of the foregoing, the dual connectivity path selection service may enable optimal network path or segment path selection in a dual connectivity context based on one or multiple criteria. For example, the one or multiple criteria may include class of user, subscriber type, type of application, 5G cell global identifier information, and/or mappings between RFSP values with QCI and/or SPID values. For example, a mapping may identify a network path or portion thereof in which RFSP values associated with a RAN may be mapped to QCI and/or SPID values.

FIG. 1 is a diagram illustrating an exemplary environment 100 in which an exemplary embodiment of dual connectivity path selection service may be implemented. As illustrated, environment 100 includes an access network 105, an external network 115, and a core network 120. Access network 105 includes access devices 107 (also referred to individually or generally as access device 107). External network 115 includes external devices 117 (also referred to individually or generally as external device 117). Core network 120 includes core devices 122 (also referred to individually or generally as core device 122). Environment 100 further includes end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or another type of network that may support a wireless service and/or an application service, as described herein.

The number, the type, and the arrangement of network devices, and the number of end devices 130 are exemplary. A network device may be implemented according to one or multiple architectures, such as a client device, a server device, a peer device, a proxy device, a cloud device, and/or a virtualized network device. Additionally, the network device may be implemented according to various computing architectures, such as centralized, distributed, cloud (e.g., elastic, public, private, etc.), edge network, fog network, and/or another type of computing architecture, and may be incorporated into various types of network architectures (e.g., software defined network (SDN), virtual network, logical network, network slice, etc.).

Environment 100 includes communication links between the networks, between the network devices, and between end devices 130 and the network/network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. According to various exemplary implementations, the interface of the network device may be a service-based interface, a reference point-based interface, an Open Radio Access Network (O-RAN) interface, a 5G interface, another generation of interface (e.g., 5.5G, 6G, 7G, etc.), or some other type of interface (e.g., proprietary, etc.).

Access network 105 may include one or multiple networks of one or multiple types and technologies. For example, access network 105 may be implemented to include a 5G RAN, a future generation RAN (e.g., a sixth generation (6G) RAN, a seventh generation (7G) RAN, or a subsequent generation RAN). Access network 105 may include a legacy RAN (e.g., a third generation (3G) RAN, a 4G or 4.5 RAN, etc.). Access network 105 may communicate with and/or include other types of access networks, such as, for example, a WiFi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 105, external network 115, and/or core network 120.

Access network 105 may include different and multiple functional splitting, such as options 1, 2, 3, 4, 5, 6, 7, or 8 that relate to combinations of access network 105 and core network 120 including an evolved packet core (EPC) network and/or an NG core (NGC) network, or the splitting of the various layers (e.g., physical layer, medium access control (MAC) layer, radio link control (RLC) layer, and packet data convergence protocol (PDCP) layer, etc.), plane splitting (e.g., user plane, control plane, etc.), a centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity or higher (e.g., a secondary cell group split bearer service, a master cell group (MCG) split bearer, an SCG bearer service, NSA, SA, etc.), carrier aggregation (CA) (e.g., intra-band, inter-band, contiguous, non-contiguous, etc.), edge and core network slicing, coordinated multipoint (CoMP), various duplex schemes (e.g., frequency division duplex (FDD), time division duplex (TDD), half-duplex FDD (H-FDD), etc.), and/or another type of connectivity service.

According to some exemplary embodiments, access network 105 may be implemented to include various architectures of wireless service, such as, for example, macrocell, microcell, femtocell, picocell, metrocell, NR cell, Long Term Evolution (LTE) cell, non-cell, or another type of cell architecture. Additionally, according to various exemplary embodiments, access network 105 may be implemented according to various wireless technologies (e.g., radio access technologies (RATs), etc.), and various wireless standards, frequencies, bands, and segments of radio spectrum (e.g., centimeter (cm) wave, millimeter (mm) wave, below 6 gigahertz (GHz), above 6 GHz, higher than mm wave, licensed radio spectrum, unlicensed radio spectrum, higher than mm wave), and/or other attributes or technologies used for radio communication. Additionally, or alternatively, according to some exemplary embodiments, access network 105 may be implemented to include various wired and/or optical architectures for wired and/or optical access services.

Depending on the implementation, access network 105 may include one or multiple types of network devices, such as access devices 107. For example, access device 107 may include a gNB, an evolved LTE (eLTE) eNB, an eNB, a radio network controller (RNC), a remote radio head (RRH), a baseband unit (BBU), a radio unit (RU), a CU, a CU control plane (CU CP), a CU user plane (CU UP), a DU, a small cell node (e.g., a picocell device, a femtocell device, a microcell device, a home eNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. Additionally, or alternatively, access device 107 may include a wired and/or optical device (e.g., modem, wired access point, optical access point, Ethernet device, etc.) that provides network access. According to some exemplary implementations, access device 107 may include a combined functionality of multiple RATs (e.g., 4G and 5G functionality, 5G and 5.5G functionality, 5G and 6G functionality, etc.) via soft and hard bonding based on demands and needs. According to some exemplary implementations, access device 107 may include an integrated functionality, such as a CU-CP and a CU-UP, or other integrations of split RAN nodes. Access device 107 may be an indoor device or an outdoor device. Access device 107 may include a controller device. For example, access device 107 may include a RAN Intelligent Controller (MC). Depending on the implementation, access device 107 may provide a wireless access service at a cell, a sector, a sub-sector, carrier, and/or other configurable level.

According to an exemplary embodiment, at least a portion of access devices 107 may include dual connectivity path selection service logic and an interface that supports the dual connectivity path selection service, as described herein. For example, according to an exemplary implementation, a CU, a CU-UP, and/or a CU-CP may include dual connectivity path selection service logic. According to another exemplary implementation, a network device that includes the dual connectivity path selection service logic may be a standalone device. For example, the network device may be a hub device. According to yet another exemplary implementation, the network device may collaboratively provide the dual connectivity path selection service with access device 107.

External network 115 may include one or multiple networks of one or multiple types and technologies. For example, external network 115 may be implemented to include a service or an application layer network, a cloud network, a private network, a public network, a multi-access edge computing (MEC) network, a fog network, the Internet, a packet data network (PDN), a service provider network, the World Wide Web (WWW), an Internet Protocol Multimedia Subsystem (IMS) network, a Rich Communication Service (RCS) network, an SDN, a virtual network, a packet-switched network, a data center, or other type of network that may provide access to and may host an end device application, service, or asset (application service).

Depending on the implementation, external network 115 may include various network devices such as external devices 117. For example, external devices 117 may include servers (e.g., web, application, cloud, etc.), mass storage devices, data center devices, network function virtualization (NFV) devices, containers, virtual machines (VMs), SDN devices, cloud computing devices, platforms, and other types of network devices and/or architectures pertaining to various network-related functions (e.g., security, management, charging, billing, authentication, authorization, policy enforcement, development, etc.). External network 115 may include one or multiple types of core devices 122, as described herein.

External devices 117 may host one or multiple types of application services. For example, the application services may pertain to broadband services in dense areas (e.g., pervasive video, smart office, operator cloud services, video/photo sharing, etc.), broadband access everywhere (e.g., 50/100 Mbps, ultra-low-cost network, etc.), higher user mobility (e.g., high speed train, remote computing, moving hot spots, etc.), IoTs (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), voice, conferencing, instant messaging), video streaming, and/or other types of wireless and/or wired application services.

According to various exemplary embodiments, one or multiple external devices 117 may be situated in a network other than external network 115, such as in access network 105 and/or core network 120. For example, an external device 117 may be co-located with an access device 107 and/or a core device 122.

Core network 120 may include one or multiple networks of one or multiple network types and technologies. Core network 120 may include a complementary network of access network 105. For example, core network 120 may be implemented to include an NGC network, an EPC of an LTE network, an LTE-Advanced (LTE-A) network, and/or an LTE-A Pro network, a future generation core network (e.g., a 5G, a 6G, a 7G, or beyond core network, etc.), and/or another type of core network.

Depending on the implementation of core network 120, core network 120 may include various types of network devices that are illustrated in FIG. 1 as core devices 122. For example, core devices 122 may include a user plane function (UPF), a Non-3GPP Interworking Function (N3IWF), an access and management mobility function (AMF), a session management function (SMF), a unified data management (UDM) device, a unified data repository (UDR) device, an authentication server function (AUSF), a network slice selection function (NSSF), a network repository function (NRF), a policy control function (PCF), a binding support function (BSF), a network data analytics function (NWDAF), a network exposure function (NEF), a lifecycle management (LCM) device, an application function (AF), a mobility management entity (MME), a packet gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS). According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), a service capability exposure function (SCEF) with a NEF (SCEF+NEF), and/or other combined nodes (e.g., an HSS with a UDM and/or UDR, an MME with an AMF, etc.).

End devices 130 include a device that may have computational and/or communication capabilities (e.g., wireless, wired, optical, etc.). End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a phablet, a wearable device (e.g., a watch, glasses, etc.), a computer, a gaming device, a music device, an IoT device, a drone, a smart device, or other type of wireless device (e.g., other type of user equipment (UE)). End device 130 may be configured to execute various types of software (e.g., applications, programs, etc.). The number and the types of software may vary among end devices 130.

End device 130 may support one or multiple RATs (e.g., 4G, 5G, and/or future generation RAT) and various portions of the radio spectrum (e.g., multiple frequency bands, multiple carrier frequencies, licensed, unlicensed, mm wave, above mm wave, etc.), various levels and genres of network slicing, DC service, and/or other types of connectivity services. Additionally, end device 130 may include one or multiple communication interfaces that provide one or multiple (e.g., simultaneous, interleaved, etc.) connections via the same or different RATs, frequency bands, carriers, network slices, and/or other communication medium (e.g., wired, etc.). The multimode capabilities of end device 130 may vary among end devices 130.

Figure 2:
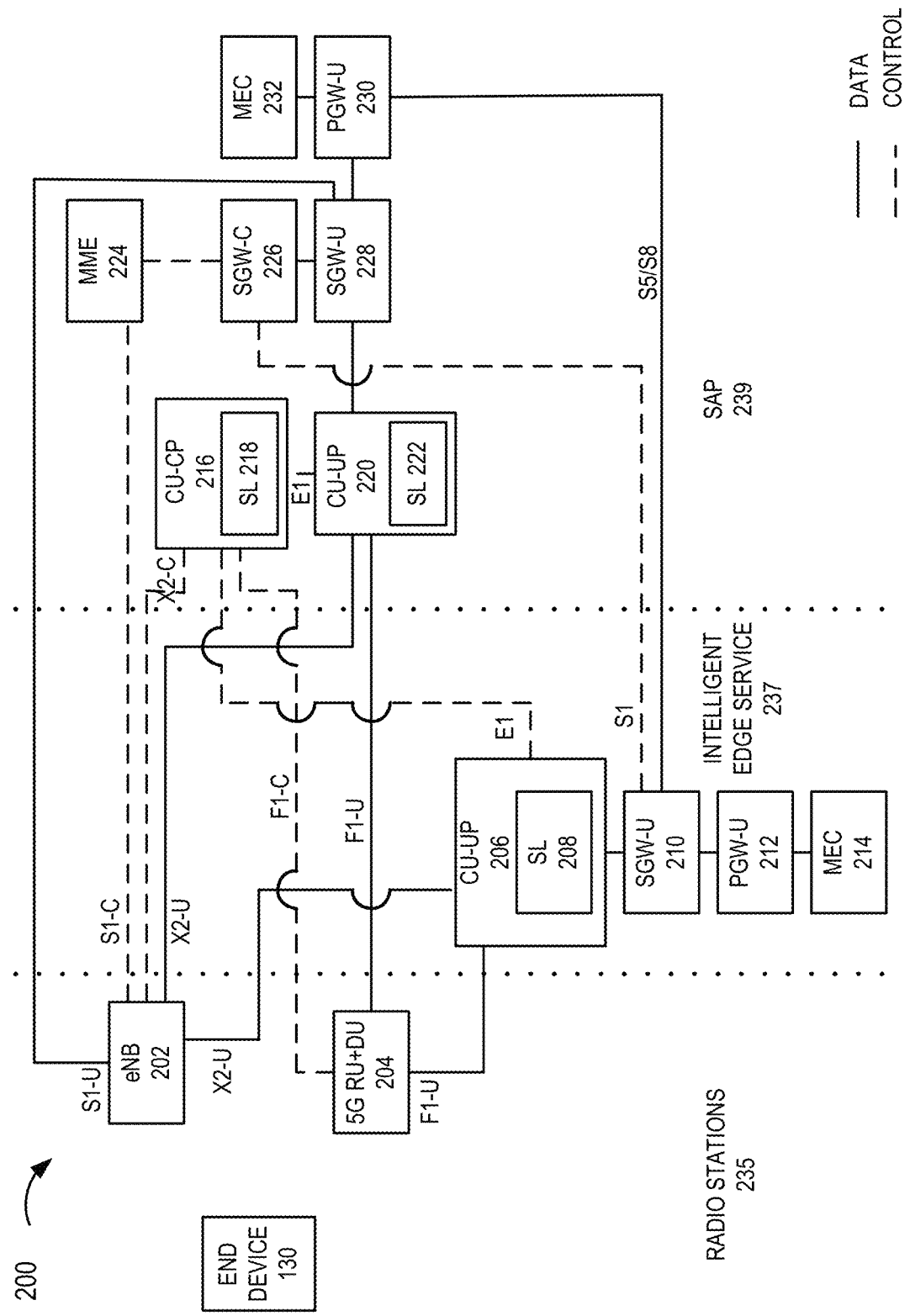
FIG. 2 is a diagram illustrating another exemplary environment in which an exemplary embodiment of the dual connectivity path selection service may be implemented.

FIG. 2 is a diagram illustrating an exemplary environment 200 in which an exemplary embodiment of dual connectivity path selection service may be implemented. As illustrated, environment 200 may include an eNB 202, a 5G RU+DU 204, a CU-UP 206 that includes service logic (SL) 208 that provides an exemplary embodiment of the dual connectivity path selection service, an SGW-U 210, a PGW-U 212, a MEC network 214, a CU-CP 216 that includes SL 218, a CU-UP 220 that includes SL 222, an MME 224, an SGW-C 226, an SGW-U 228, a PGW-U 230, and a MEC network 232.

According to other exemplary embodiments, different, additional, or fewer access devices 107, core devices 122, and/or external devices 117 may be implemented. For example, in radio stations 235 section of environment 200, there may be different types of access devices 107, such as gNBs, non-split access devices 107, eLTE eNBs, and so forth. Additionally, in intelligent edge service 237 section of environment 200, there may be different types of access devices 107 and/or core devices 122 (e.g., SMF, UPF, non-split core devices, and so forth), and in service access point (SAP) 239 section of environment 200 there may be different access devices 107, core devices 122, and/or external network 115/external devices 117. According to some exemplary embodiments, MEC network 214 may be near edge or co-located to access device 107 of access network 105, and MEC network 232 may be far edge or co-located to core device 122 of core network 120. According to other exemplary embodiments, MEC 214 and/or MEC 232 may be situated elsewhere. Additionally, the number and/or arrangement of an external network 115 and/or external device 117 may be different relative to access network 105, core network 120, or another type of network (e.g., x-haul, etc.). The connections between network devices illustrated in FIG. 2 are exemplary. As illustrated, the connections may include control plane (e.g., depicted as dashed lines) and user plane (e.g., depicted as solid lines). Additionally, the interfaces illustrated (e.g., F1-U, X2-U, F1-C, etc.) are merely exemplary.

According to an exemplary embodiment, CU-CP 216 includes service logic 218 that provides an exemplary embodiment of the dual connectivity path selection service. For example, CU-CP 216 may select an end-to-end path or a segment of the end-to-end path that provides a connection between end device 130 and an application service, as described herein. According to an exemplary implementation, the segment path may be the path in access network 105. For example, the segment path may be between a RAN device (e.g., eNB 202, 5G RU+DU 204, 5G RU+DU 204 and CU-UP 206, or 5G RU+DU 204 and CU-UP 220) and end device 130. According to an exemplary embodiment, CU-CP 216 may select the end-to-end path or the segment path based on mapping information, as described herein. Exemplary embodiments of the mapping information are described further below.

Figure 3A:
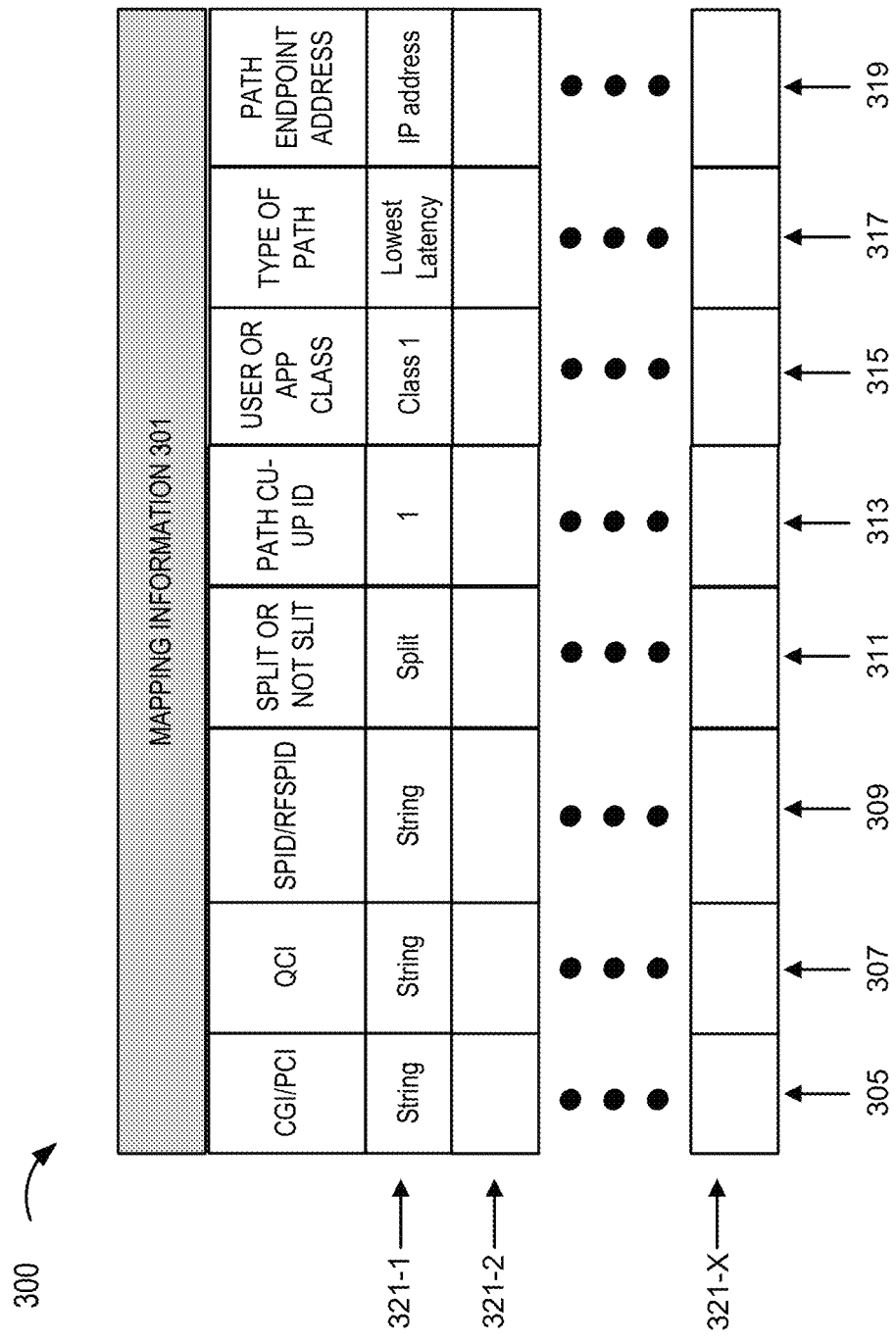
FIG. 3A is a diagram illustrating an exemplary embodiment of mapping information.

FIG. 3A is a diagram that illustrates exemplary mapping information 301. For example, referring to a table 300 in FIG. 3A, exemplary mapping information 301 is illustrated. Table 300 may include a CGI/PCI field 305, a QCI field 307, an SPID/RFSPID field 309, a split/not split field 311, a path CU-UP ID field 313, a user/application class field 315, a type of path field 317, and a path endpoint address field 319. According to other exemplary embodiments, mapping information 301 may include fewer, additional, and/or different fields, as described herein.

As further illustrated, table 300 includes entries 321-1 through 321-X (also referred to as entries 321, or individually or generally as entry 321) that each includes a grouping of fields 305 through 319 that are correlated (e.g., a record, etc.). The mapping information 301 is illustrated in tabular form merely for the sake of description. In this regard, mapping information 301 may be implemented in a data structure different from a table (e.g., a list, a flat file, etc.), a database, or another type of structure. Additionally, values illustrated in fields 305 through 319 are exemplary. According to other embodiments, the values, strings, or instances of information stored in a field may be different. The number of entries 321 are exemplary for the sake of description purposes.

CGI/PCI field 305 may store data that indicates a CGI, a PCI, and/or another type of identifier, such as a globally unique network device identifier. For example, CGI/PCI field 305 may store data that indicates a globally unique identifier that identifies a DU, an RU, an eNB, a DU+RU, a gNB, or another type of wireless station.

QCI field 307 may store data that indicates a 4G QCI, a 5G QoS Identifier (5QI), or another type of identifier that may indicate a QoS class, a type of QoS flow, or performance metric, for example. The QCI values of QCI field 307 may include values associated with a standard (e.g., 3GPP, 3GPP2, ITU, ETSI, GSMA, etc.) and values defined by an operator, for example. SPID/RFSPID field 309 may store a SPID, an RFSPID, or another type of identifier that may identify a subscriber profile or similar information. According to some exemplary embodiments, an SPID or an RFSPID may be operator defined to enable mappings to certain subscriber or end device types and associated QCI, user class or application class, and/or other information of mapping information 301.

Split/not split field 311 may store data that indicates a configuration for dual connectivity, such as SCG split bearer, MCG split bearer, SCG bearer (non-split), MCG bearer (non-split), or another type of configuration pertaining to the routing of traffic.

Path CU-UP ID field 313 may store data that identifies a path or a segment between end device 130 and a CU-UP.

According to other embodiments, depending on the access devices 107 implemented, this field may store data that identifies a path or a segment between end device 130 and another type of access device 107, for example.

User/application class field 315 may store data that indicates a class of service associated with a user (e.g., of end device 130) or an application service. The class of service may afford a certain level of priority, minimum performance metric, and/or other attributes of wireless service, a connection that supports an application service/session, and so forth.

Type of path field 317 may store data that may indicate a type of end-to-end or segment path. For example, the type may indicate one or multiple performance metrics (e.g., low latency, high throughput, low error rate, etc.), one or multiple performance metrics and values (e.g., maximum latency value, minimum throughput, minimum bitrate, etc.), and/or other types of configurable labels or categories (e.g., best available, etc.).

Path endpoint address field 319 may store data that indicates an identifier and/or a network address pertaining to a network device. For example, path endpoint address field 319 may store data that indicates an identifier of a CU-UP and/or an Internet Protocol (IP) address of the CU-UP. According to other embodiments, depending on the access devices 107 implemented, this field may store data that indicates an identifier and/or a network address pertaining to another type of access device 107, for example.

Figure 3B:
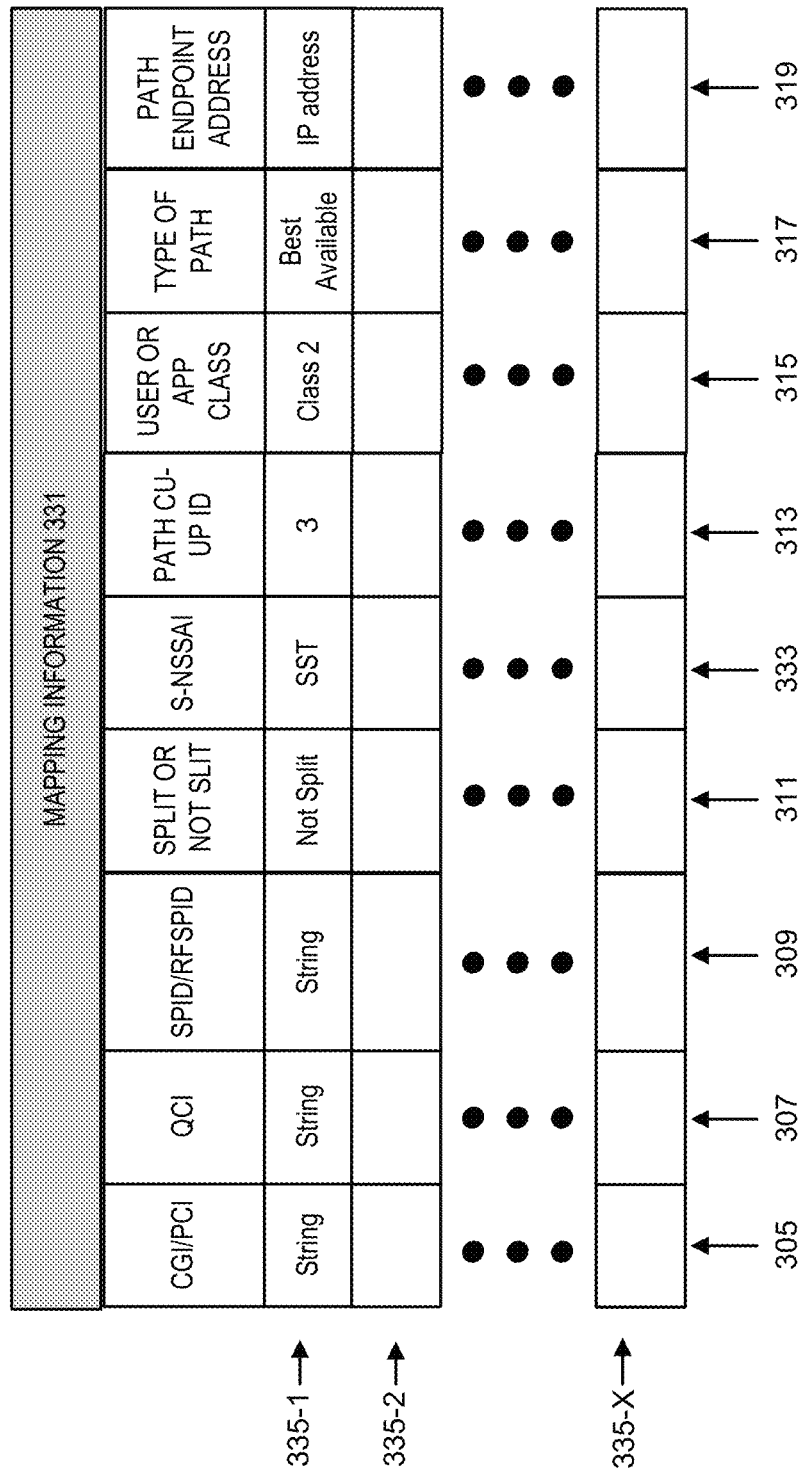
FIG. 3B is a diagram illustrating another exemplary embodiment of the mapping information.

FIG. 3B is a diagram that illustrates exemplary mapping information 331. For example, referring to a table 330 in FIG. 3B, exemplary mapping information 331 is illustrated. Table 330 may include CGI/PCI field 305, QCI field 307, SPID/RFSPID field 309, split/not split field 311, path CU-UP ID field 313, user/application class field 315, type of path field 317, and path endpoint address field 319, as previously described in relation to table 300 of FIG. 3A. Additionally, table 330 may include a Singe-Network Slice Selection Assistance Information (S-NSSAI) field 333. According to other exemplary embodiments, mapping information 331 may include fewer, additional, and/or different fields, as described herein.

As further illustrated, table 330 includes entries 335-1 through 335-X (also referred as entries 335, or individually or generally as entry 335) that each includes a grouping of fields 305 through 319 and field 333 that are correlated (e.g., a record, etc.). Mapping information 331 is illustrated in tabular form merely for the sake of description. The values illustrated in fields are exemplary. According to other embodiments, the values, strings, or instances of information stored in a field may be different. The number of entries 335 are exemplary for the sake of description purposes.

S-NSSAI field 333 may store data that includes S-NSSAI. For example, S-NSSAI field 333 may include data that indicates a slice/service type (SST) value. The data may also include slice differentiator (SD) information, for example.

According to some exemplary embodiments, the mapping information, as described herein, may include other instances of information. For example, a NWDAF and/or artificial intelligence (AI) device may provide load and/or available resource information (e.g., current, predictive) that may correlate to an end-to-end path or segment path associated with an entry of the mapping information. For example, the load and/or available network resource information may pertain to a RAN device (e.g., CU-UP, a gNB, an eNB, etc.), a communication link, a network resource of the RAN device (e.g., processor, memory, etc.), a network slice, and/or another physical, logical, or virtual resource. The load and/or available resource information may be updated (e.g., continuously, etc.). CU-CP 216 may select a path based on this additional information of the mapping information.

Referring back to FIG. 2, as previously explained, SL 218 of CU-CP 216 may select an end-to-end path or a segment path based on mapping information. SL 218 may store the mapping information (e.g., mapping information 301 and/or mapping information 331). SL 218 may also provide mapping information to CU-UPs (e.g., CU-UP 220, CU-UP 206) of a given geographic area. The mapping information may relate to cells under the control of the CU-UP.

Figure 4A:
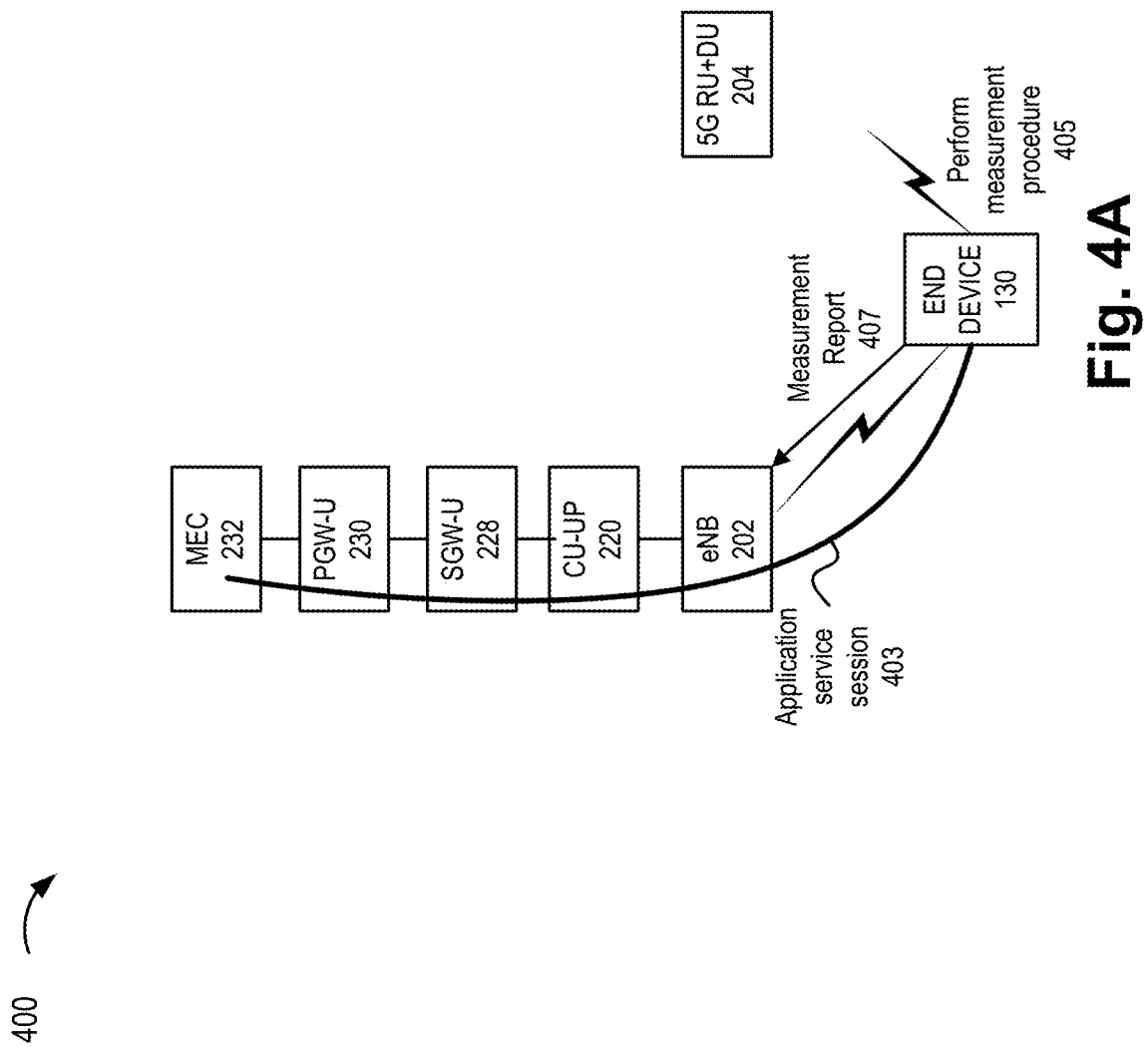
FIGS. 4A-4D are diagrams illustrating exemplary processes of an exemplary embodiment of a dual connectivity path selection service.

FIGS. 4A-4D are diagrams illustrating an exemplary process 400 of an exemplary embodiment of the dual connectivity path selection service. Referring to FIG. 4A, according to an exemplary scenario, end device 130 establishes an application service session 403 with an application service hosted at MEC 232. The end-to-end path includes traversing eNB 202, CU-UP 220, SGW-U 228, and PGW-U 230 to reach MEC 232. Assume, that CU-CP 216 selected the 4G MCG bearer path to carry traffic of a particular user and/or application class and QCI based on the mapping information, as described herein. Subsequently, based on a measurement configuration message from eNB 202 to end device 130 (not illustrated), end device 130 may perform in accordance with measurement configuration message, a measurement procedure 405 pertaining to available cell coverage. Based on the performance of the measurement procedure, end device 130 may generate and transmit a measurement report 407 to eNB 202. According to an exemplary embodiment, measurement report 407 includes a CGI value that uniquely identifies (globally) the cell that has been measured. According to this exemplary scenario, assume end device 130 measured a cell of 5G RU+DU 204.

Figure 4B:
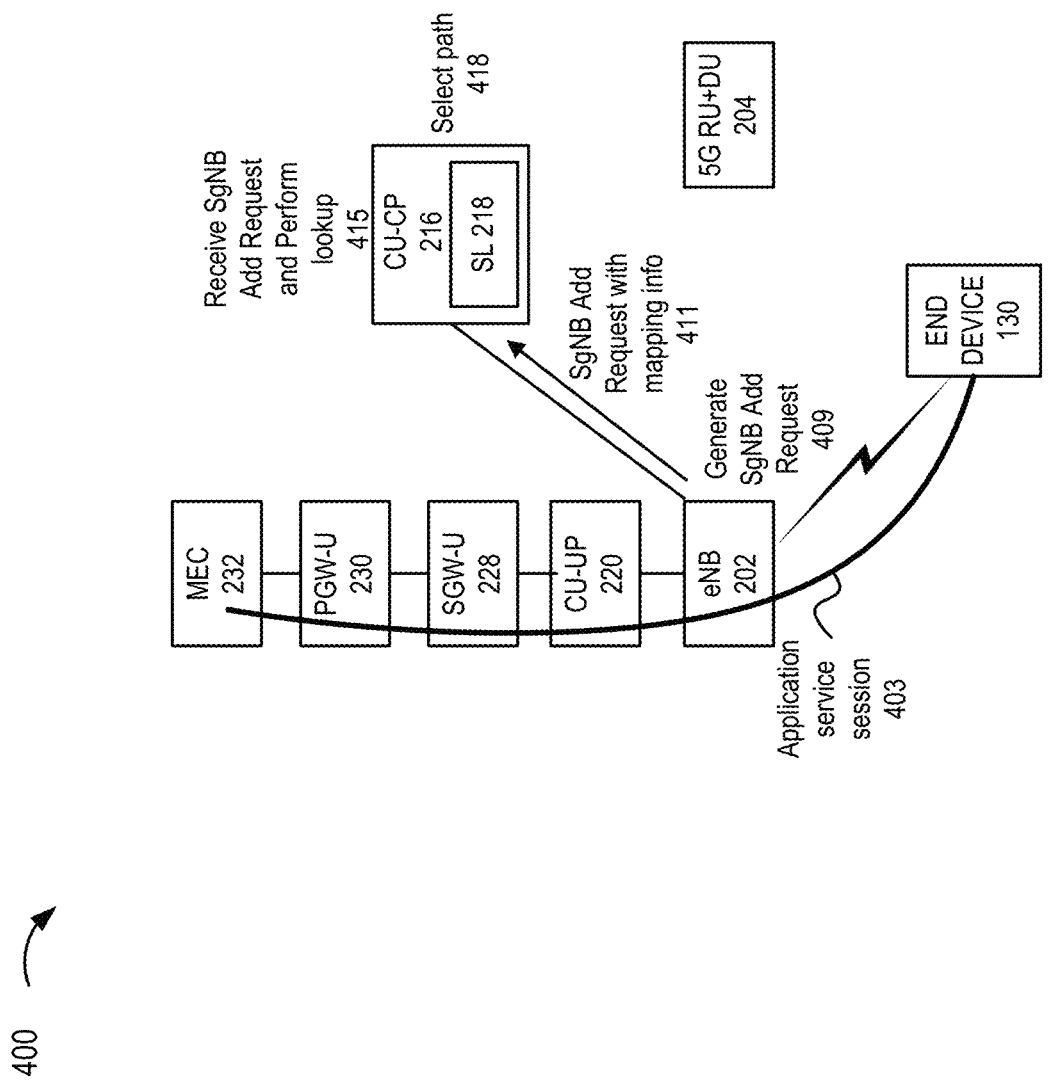

Referring to FIG. 4B, based on an analysis of the measurement report 407, eNB 202 may generate and transmit an SgNB Add request 409. For example, based on the measured value(s) associated with a cell of 5G RU+DU 204 and a threshold value, eNB 202 determines the threshold value is satisfied and generates and transmits the SgNB Add request 409. According to an exemplary implementation, SgNB Add request 411 may include the measurement report, and mapping information associated with a SCG pertaining to 5G RU+DU 204. For example, the mapping information may include the CGI of the cell and an RFSPID, a SPID, and/or a QCI, as described herein. According to an exemplary implementation, eNB 202 may store context information, which includes RFSPID or SPID and QCI, pertaining to application service session 403 and end device 130. eNB 202 may select and include such context information in SgNB Add request 409.

As further illustrated in FIG. 4B, CU-CP 216 may receive SgNB Add request 411 and in response perform a lookup 415. For example, SL 218 of CU-CP 216 may compare information included in SgNB Add request 411 to mapping information, such as mapping information 301 or mapping information 331, as described herein. Based on the comparison, SL 218 may select a path 418. For example, SL 218 may match the CGI of the cell and other mapping information (e.g., SPID, QCI, or other mapping information) to an entry 321 or entry 335. Additionally, according to this exemplary scenario, CU-CP 216 may make other determinations, such as whether to have a split SCG or not (i.e., a non-split SCG). For example, when the application service session pertains to a low latency application and the current context is such that end device 130 has an application session via a low capacity master node (e.g., eNB 202), CU-CP 216 may use the mapping information for determining to have a non-split SCG. According to other examples, this may not be the case based on other context and/or correlated mapping information of relevance to a candidate cell (e.g., associated with 5G RU+DU 204). Additionally, for example, CU-CP 216 may identify a user class or application class based on the correlated mapping information and one or multiple entries 321 or entries 335 of relevance.

Figure 4C:
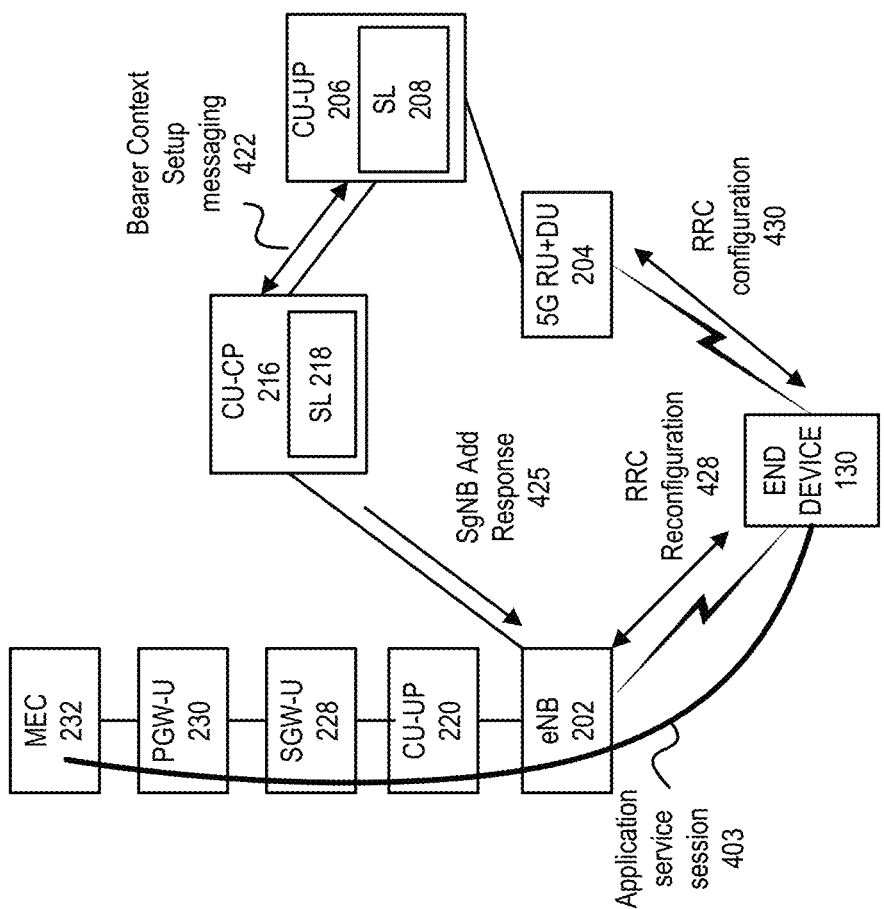

Referring to FIG. 4C, according to an exemplary scenario, assume SL 218 of CU-CP 216 selects an end-to-end path that traverses CU-UP 206 and includes MEC 232. As illustrated, CU-CP 216 and CU-UP 206 may exchange bearer context setup messaging 422, such as E1AP bearer context setup request and response messages. Additionally, CU-CP 215 may generate and transmit a SgNB Add response 425 that includes an indication of the selected CU-UP 206 and/or 5G RU+DU 204. Based on receiving the SgNB Add response 425, eNB 202 and end device 130 may exchange RRC reconfiguration messaging 428. Additionally, end device 130 and 5G RU+DU 204 may exchange RRC configuration messaging 430. Although not illustrated, SGW-U 210 and PGW-U 212 that provides a path to MEC 214 may be selected by MME 224 and SGW-C 226 based on modify bearer messaging and other core network messaging.

Figure 4D:
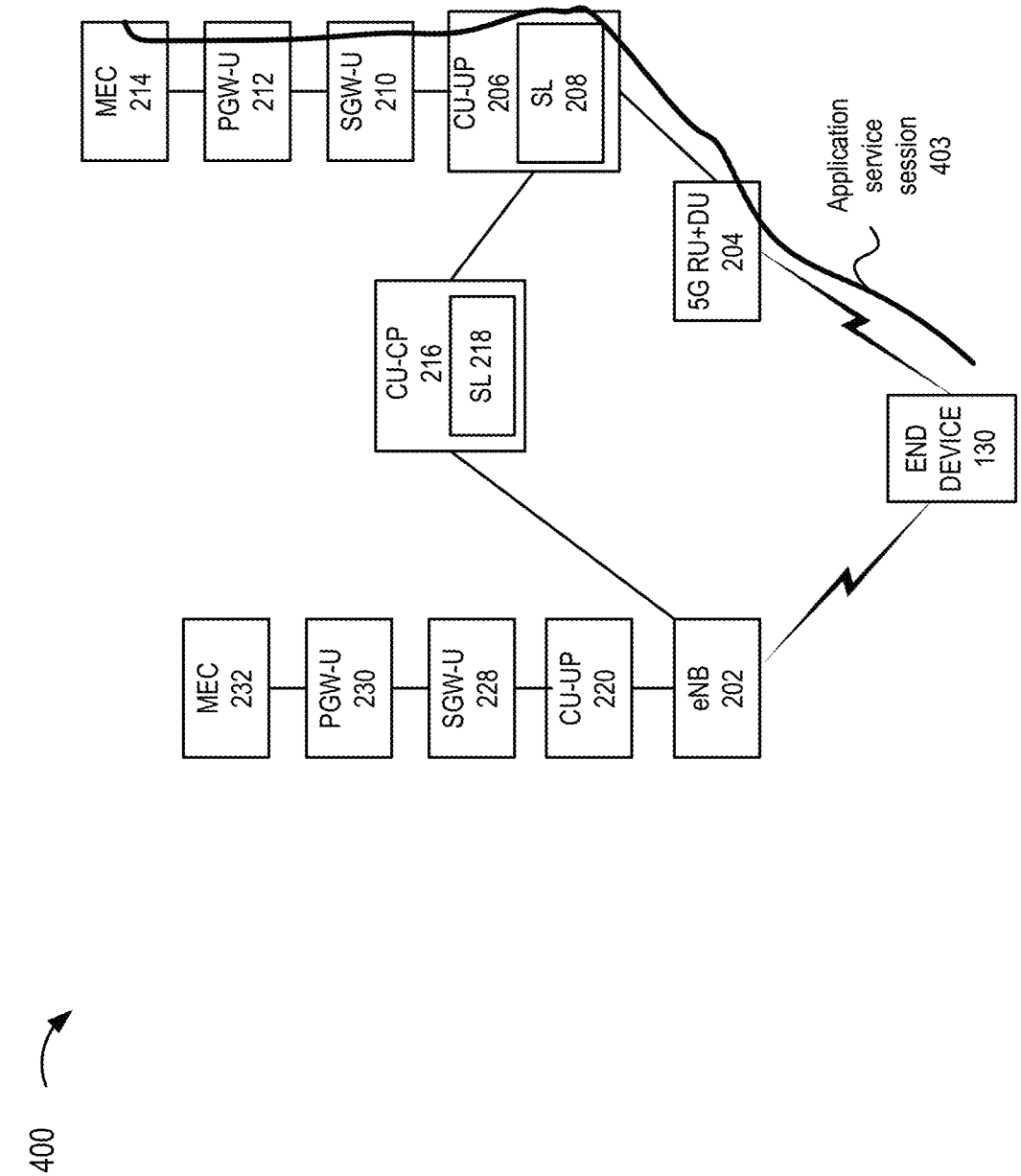

Referring to FIG. 4D, end device 130 may establish application service session 403 with MEC 214 via 5G RU+DU, CU-UP 206, and SGW/PGW 210/212, as illustrated. According to this exemplary scenario, application service session 403 migrated from an MCG bearer to an SCG bearer.

FIGS. 4A-4D illustrate an exemplary embodiment of an exemplary process of the dual connectivity path selection service. According to other exemplary embodiments, the process may include additional, fewer, and/or different operations. Additionally, some operations associated with process 400 may have been omitted for the sake of brevity and/or because such operations may be outside the scope of this description. For example, process 400 may include operations to migrate the application session from MEC 232 to MEC 214.

Figure 4F:
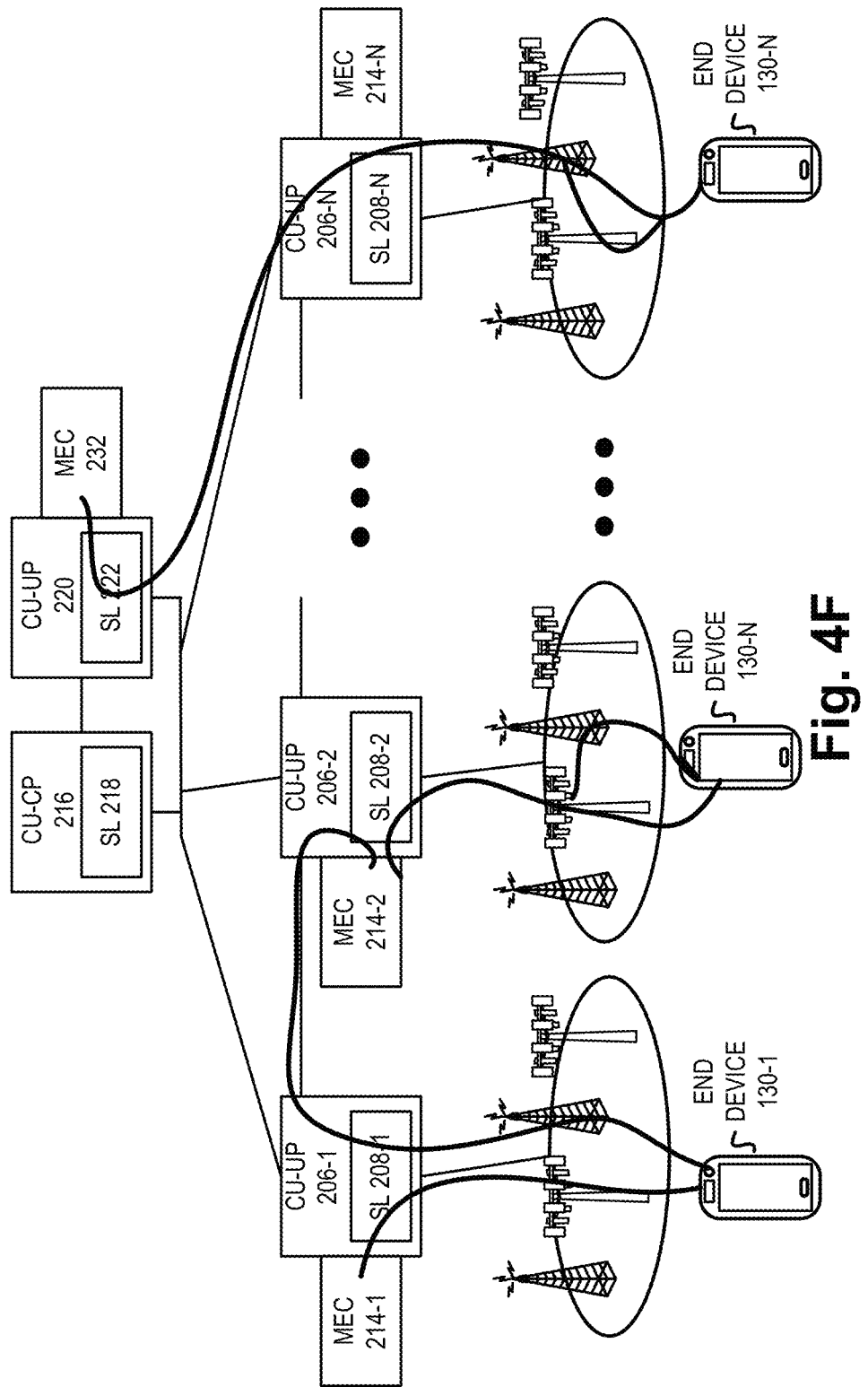

According to other exemplary scenarios, the dual connectivity path selection service may select a path for a SCG split configuration, an MCG split configuration, or another type of configuration, as described herein. For example, referring to FIG. 4E, SL 218 of CU-CP 216 may have selected a segment path, which includes CU-UP 220 and 5G RU+DU 204, to support the application service session 403. Additionally, according to other exemplary scenarios, the dual connectivity path selection service may support other types of DC scenarios, such as NR-DC (5G-SA) (e.g., master node is a gNB (MgNB)). FIG. 4F is a diagram that illustrates other exemplary scenarios in which various bearer connections may be configured based on the dual connectivity path selections service. For example, referring to end device 130-1, one application service session may be configured for a MEC 214-1 while another application service session may be configured for a MEC 214-2. According to some exemplary scenarios, the MEC 214-2 application service session may involve a handover scenario. Also, for end device 130-2, the application service session may be supported by an SCG split bearer configuration, and for end device 130-N, the application service session may be supported by an MCG split bearer configuration.

The dual connectivity path selection service may also support other types of scenarios, such as a handover scenario. For example, according to an intra-CU-CP for which there is an SgNB handover, for example, the source and target SgNBs may be managed by the same CU-CP. As such, the CU-CP may perform similar operations to those described and illustrated herein, such as using a measurement report identifying the path or end-to-end path pertaining to a target CU-UP and/or target SgNB. According to an inter-CU-CP situation in which the source and target SgNBs may be managed by different CU-CPs, the measurement report of end device 130, which includes the measurement pertaining to the target SgNB and CGI, for example, may be forwarded to the target CU-CP via the source CU-CP. The target CU-CP may select the path based on the measurement report and the mapping information, as described herein. According to other exemplary scenarios, a handover may be performed between master nodes. In some situations, the source SgNB may remain the same or the source SgNB connection may change and be torn down, and target master node and target SgNB, for example, may configured.

FIG. 5 is a diagram illustrating exemplary components of a device 500 that may be included in one or more of the devices described herein. For example, device 500 may correspond to access device 107, external device 117, core device 122, end device 130, CU-CP 216, SL 218, CU-UP 206, SL 208, and/or other types of network devices, as described herein. As illustrated in FIG. 5, device 500 includes a bus 505, a processor 510, a memory/storage 515 that stores software 520, a communication interface 525, an input 530, and an output 535. According to other embodiments, device 500 may include fewer components, additional components, different components, and/or a different arrangement of components than those illustrated in FIG. 5 and described herein.

Bus 505 includes a path that permits communication among the components of device 500. For example, bus 505 may include a system bus, an address bus, a data bus, and/or a control bus. Bus 505 may also include bus drivers, bus arbiters, bus interfaces, clocks, and so forth.

Processor 510 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 510 may be implemented as hardware (e.g., a microprocessor, etc.), a combination of hardware and software (e.g., a SoC, an ASIC, etc.), may include one or multiple memories (e.g., cache, etc.), etc.

Processor 510 may control the overall operation, or a portion of operation(s) performed by device 500. Processor 510 may perform one or multiple operations based on an operating system and/or various applications or computer programs (e.g., software 520). Processor 510 may access instructions from memory/storage 515, from other components of device 500, and/or from a source external to device 500 (e.g., a network, another device, etc.). Processor 510 may perform an operation and/or a process based on various techniques including, for example, multithreading, parallel processing, pipelining, interleaving, learning, model-based, etc.

Memory/storage 515 includes one or multiple memories and/or one or multiple other types of storage mediums. For example, memory/storage 515 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 515 may include a hard disk (e.g., a magnetic disk, an optical disk, a magneto-optic disk, a solid-state disk, etc.), a Micro-Electromechanical System (MEMS)-based storage medium, and/or a nanotechnology-based storage medium. Memory/storage 515 may include drives for reading from and writing to the storage medium.

Memory/storage 515 may be external to and/or removable from device 500, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 515 may store data, software, and/or instructions related to the operation of device 500.

Software 520 includes an application or a program that provides a function and/or a process. As an example, with reference to application service manager 119, software 520 may include an application that, when executed by processor 510, provides a function and/or a process of the dual connectivity path selection service, as described herein. Software 520 may also include firmware, middleware, microcode, hardware description language (HDL), and/or other form of instruction. Software 520 may also be virtualized. Software 520 may further include an operating system (OS) (e.g., Windows, Linux, Android, proprietary, etc.).

Communication interface 525 permits device 500 to communicate with other devices, networks, systems, and/or the like. Communication interface 525 includes one or multiple wireless interfaces and/or wired interfaces. For example, communication interface 525 may include one or multiple transmitters and receivers, or transceivers. Communication interface 525 may operate according to a protocol stack and a communication standard. Communication interface 525 may include an antenna. Communication interface 525 may include various processing logic or circuitry (e.g., multiplexing/de-multiplexing, filtering, amplifying, converting, error correction, application programming interface (API), etc.). Communication interface 525 may be implemented as a point-to-point interface, a service-based interface, or a reference interface, for example.

Input 530 permits an input into device 500. For example, input 530 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 535 permits an output from device 500. For example, output 535 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 500 may be implemented in the same manner. For example, device 500 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in an application layer network (e.g., external network 115) and/or another type of network (e.g., access network 105, core network 120, etc.). Thus, network devices described herein may be implemented as device 500.

Device 500 may perform a process and/or a function, as described herein, in response to processor 510 executing software 520 stored by memory/storage 515. By way of example, instructions may be read into memory/storage 515 from another memory/storage 515 (not shown) or read from another device (not shown) via communication interface 525. The instructions stored by memory/storage 515 cause processor 510 to perform a function or a process described herein. Alternatively, for example, according to other implementations, device 500 performs a function or a process described herein based on the execution of hardware (processor 510, etc.).

Figure 6:
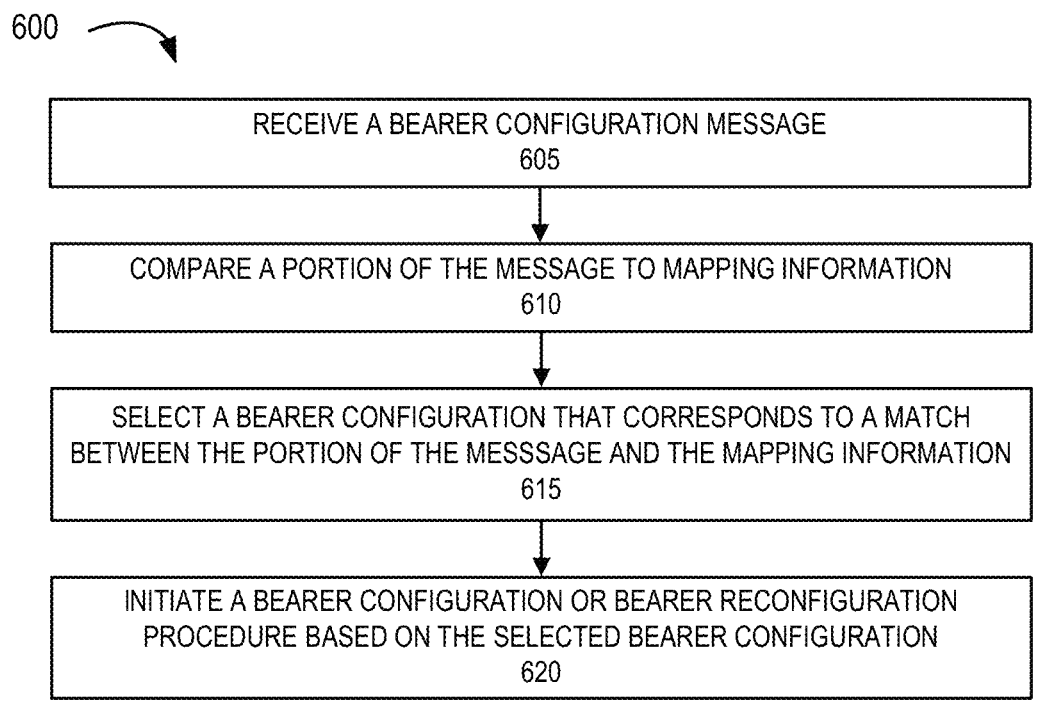
FIG. 6 is a flow diagram illustrating an exemplary process of an exemplary embodiment of a dual connectivity path selection service.

FIG. 6 is a flow diagram illustrating an exemplary process 600 of an exemplary embodiment of dual connectivity path selection service. According to an exemplary embodiment, CU-CP may perform a step of process 600. According to another exemplary embodiment, a CU, a RIC, or another type of RAN controller device may perform a step of process 600. According to an exemplary implementation, processor 510 executes software 520 to perform the step of process 600, as described herein. Alternatively, the step may be performed by execution of only hardware.

In block 605, a CU-CP may receive a bearer configuration message. For example, the bearer configuration message may be a secondary node add request, a secondary node drop request, a handover message (e.g., intra, inter), or another type of configuration request or message that may provide a basis for a bearer configuration or a bearer reconfiguration pertaining to end device 130 and the network (e.g., access network 105, core network 120, external network 115, etc.). According to various exemplary implementations, the bearer configuration message may include a CGI or a PCI pertaining to a cell of relevance. According to various exemplary implementations, the bearer configuration message may include QCI information, SPID information, and/or RFSPID information. According to an exemplary implementation, the bearer configuration message may include a measurement report, as described herein.

In block 610, the CU-CP may compare a portion of the message to mapping information. For example, the CU-CP may store the mapping information, as described herein. CU-CP may compare some of the information included in the bearer configuration message to the mapping information. For example, CU-CP may perform a lookup and identify an entry that matches the CGI and other mapping information (e.g., QCI, SPID, RFSPID, etc.) of the message to the mapping information. The CU-CP may make a determination of the appropriate bearer configuration, such as split or non-split. According to some exemplary embodiments, the CU-CP may make a determination of the appropriate bearer configuration based on other context information, such as load or available resource values, user or application class, and/or other mapping information, as described herein.

In block 615, the CU-CP may select a bearer configuration that corresponds to a match between the portion of the message and the mapping information. For example, the CU-CP may select an initial configuration or a reconfiguration for a bearer to support user plane traffic, as described herein.

In block 620, the CU-CP may initiate a bearer configuration or reconfiguration procedure based on the selected bearer configuration. For example, the CU-CP may initiate the configuration of a bearer configuration with various other network devices, such as an access device 107 (e.g., CU-UP, eNB, RU+DU, etc.). The CU-CP may also initiate the configuration of the bearer configuration with a core device 122 (e.g., MME, SGW-C, SMF, etc.).

FIG. 6 illustrates an exemplary embodiment of a process of dual connectivity path selection service, according to other exemplary embodiments, the dual connectivity path selection service may perform additional operations, fewer operations, and/or different operations than those illustrated and described.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described regarding the process illustrated in FIG. 6, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 510, etc.), or a combination of hardware and software (e.g., software 520).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 510) of a device. A non-transitory storage medium includes one or more of the storage mediums described in relation to memory/storage 515. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
receiving, by a network device of a radio access network (RAN), a configuration request that includes a cell global identifier, a subscriber profile identifier, and a quality of service class identifier;
comparing, by the network device, at least a portion of the configuration request to mapping information that includes cell global identifiers and at least one of subscriber profile identifiers or quality of service class identifiers correlated to dual connectivity bearer configurations;
selecting, by the network device based on a match of the comparing, a dual connectivity bearer configuration including one of a secondary cell group (SCG) bearer configuration, an SCG split bearer configuration, a master cell group (MCG) bearer configuration, or an MCG split bearer configuration; and
initiating, by the network device based on the selecting, a dual connectivity bearer configuration procedure.

2. The method of claim 1, wherein the mapping information correlates cell global identifiers, subscriber profile identifiers, quality of service class identifiers, and user or application classes to different dual connectivity bearer configurations.

3. The method of claim 2, wherein the different dual connectivity bearer configurations include SCG bearer configurations, SCG split bearer configurations, MCG bearer configurations, and MCG split bearer configurations.

4. The method of claim 1, wherein the configuration request includes a measurement report pertaining to a next generation Node B or a distributed unit of the RAN.

5. The method of claim 1, wherein the configuration request includes a secondary next generation Node B (gNB) add request or a secondary gNB drop request.

6. The method of claim 1, wherein the dual connectivity bearer configuration procedure comprises:
transmitting, by the network device, a bearer context setup message to a centralized unit-user plane device associated with the selected dual connectivity bearer configuration.

7. The method of claim 1, wherein the mapping information includes path identifiers for paths in the RAN and load values pertaining to network resources associated with the paths.

8. The method of claim 1, wherein the network device is a centralized unit or a centralized unit-control plane.

9. A network device comprising:
a processor configured to:
receive a configuration request that includes a cell global identifier, a subscriber profile identifier, and a quality of service class identifier, wherein the network device is of a radio access network (RAN);
compare at least a portion of the configuration request to mapping information that includes cell global identifiers and at least one of subscriber profile identifiers or quality of service class identifiers correlated to dual connectivity bearer configurations;
select, based on a match of the comparison, a dual connectivity bearer configuration including one of a secondary cell group (SCG) bearer configuration, an SCG split bearer configuration, a master cell group (MCG) bearer configuration, or an MCG split bearer configuration; and
initiate, based on the selection, a dual connectivity bearer configuration procedure.

10. The network device of claim 9, wherein the mapping information correlates cell global identifiers, subscriber profile identifiers, quality of service class identifiers, and user or application classes to different dual connectivity bearer configurations.

11. The network device of claim 10, wherein the different dual connectivity bearer configurations include SCG bearer configurations, SCG split bearer configurations, MCG bearer configurations, and MCG split bearer configurations.

12. The network device of claim 9, wherein the configuration request includes a measurement report pertaining to a next generation Node B or a distributed unit of the RAN.

13. The network device of claim 9, wherein the configuration request includes a secondary next generation Node B (gNB) add request or a secondary gNB drop request.

14. The network device of claim 9, wherein when initiating, the processor is further configured to:
transmit a bearer context setup message to a centralized unit-user plane device associated with the selected dual connectivity bearer configuration.

15. The network device of claim 9, wherein the network device is a centralized unit or a centralized unit-control plane.

16. The network device of claim 9, wherein the mapping information includes path identifiers for paths in the RAN and load values pertaining to network resources associated with the paths.

17. A non-transitory computer-readable storage medium storing instructions executable by a processor of a network device, which when executed cause the processor to:
receive a configuration request that includes a cell global identifier, a subscriber profile identifier, and a quality of service class identifier, wherein the network device is of a radio access network (RAN);
compare at least a portion of the configuration request to mapping information that includes cell global identifiers and at least one of subscriber profile identifiers or quality of service class identifiers correlated to dual connectivity bearer configurations;
select, based on a match of the comparison, a dual connectivity bearer configuration including one of a secondary cell group (SCG) bearer configuration, an SCG split bearer configuration, a master cell group (MCG) bearer configuration, or an MCG split bearer configuration; and
initiate, based on the selection, a dual connectivity bearer configuration procedure.

18. The non-transitory computer-readable storage medium of claim 17, wherein the mapping information correlates cell global identifiers, subscriber profile identifiers, quality of service class identifiers, and user or application classes to different dual connectivity bearer configurations.

19. The non-transitory computer-readable storage medium of claim 18, wherein the different dual connectivity bearer configurations include SCG bearer configurations, SCG split bearer configurations, MCG bearer configurations, and MCG split bearer configurations.

20. The non-transitory computer-readable storage medium of claim 17, wherein the mapping information includes path identifiers for paths in the RAN and load values pertaining to network resources associated with the paths.

* * * * *